(12) United States Patent
Gomez et al.

(10) Patent No.: US 9,170,569 B2
(45) Date of Patent: Oct. 27, 2015

(54) METHOD FOR ELECTING AN ACTIVE MASTER DEVICE FROM TWO REDUNDANT MASTER DEVICES

(71) Applicant: Schneider Electric Industries SAS, Rueil Malmaison (FR)

(72) Inventors: Gerard Gomez, Le Broc (FR); Jean Jacques Adragna, Nice (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 359 days.

(21) Appl. No.: 13/768,483

(22) Filed: Feb. 15, 2013

(65) Prior Publication Data

US 2013/0211552 A1      Aug. 15, 2013

(30) Foreign Application Priority Data

Feb. 15, 2012    (FR) ..................................... 12 51378

(51) Int. Cl.
| | |
|---|---|
| G05B 11/01 | (2006.01) |
| G06F 11/20 | (2006.01) |
| H04L 12/40 | (2006.01) |

(52) U.S. Cl.
CPC ............ *G05B 11/01* (2013.01); *G06F 11/2005* (2013.01); *H04L 12/40202* (2013.01); *H04L 2012/4026* (2013.01)

(58) Field of Classification Search
None
See application file for complete search history.

(56) References Cited

U.S. PATENT DOCUMENTS

| | | | |
|---|---|---|---|
| 5,682,476 A | 10/1997 | Tapperson et al. | |
| 5,777,874 A | 7/1998 | Flood et al. | |
| 6,047,222 A * | 4/2000 | Burns et al. ..................... | 700/79 |
| 6,236,334 B1 | 5/2001 | Tapperson et al. | |
| 6,446,201 B1 | 9/2002 | Gunther | |
| 6,757,777 B1 | 6/2004 | Griessbach et al. | |
| 7,797,061 B2 * | 9/2010 | El-Sayed ........................ | 700/21 |
| 7,877,625 B2 * | 1/2011 | Mendu ........................... | 714/4.1 |
| 2001/0056304 A1 * | 12/2001 | Nitta ............................... | 700/21 |
| 2002/0083364 A1 | 6/2002 | Christensen et al. | |
| 2003/0043052 A1 | 3/2003 | Tapperson et al. | |

(Continued)

FOREIGN PATENT DOCUMENTS

| | | |
|---|---|---|
| DE | 198 42 593 A1 | 3/2000 |
| DE | 10 2007 040 425 A1 | 2/2009 |

OTHER PUBLICATIONS

French Preliminary Search Report issued Sep. 19, 2012, in French 1251378, filed Feb. 15, 2012 (with English Translation of Categories of Cited Documents).

*Primary Examiner* — Carlos Ortiz Rodriguez

(74) *Attorney, Agent, or Firm* — Oblon, McClelland, Maier & Neustadt, L.L.P.

(57) ABSTRACT

A method includes electing an item of active master equipment from two redundant primary and secondary master items of equipment (10, 20), the primary and secondary master items of equipment (10, 20) being directly connected to a fieldbus (1) and linked together by a terminal cable (30) and each having an active operating mode and a standby mode. Each of the primary and secondary master items of equipment (10, 20) also has one and the same state machine (12, 22) for designating one of the primary and secondary master items of equipment (10, 20) as the active master item of equipment, and the terminal cable (30) used for establishing a directional relation of the primary master item of equipment (10, 20) to the secondary master item of equipment (10, 20).

4 Claims, 4 Drawing Sheets

(56) References Cited

U.S. PATENT DOCUMENTS

| | | |
|---|---|---|
| 2005/0047330 A1 | 3/2005 | Tapperson et al. |
| 2005/0047331 A1 | 3/2005 | Tapperson et al. |
| 2005/0049727 A1 | 3/2005 | Tapperson et al. |
| 2005/0066104 A1* | 3/2005 | Train et al. .................... 710/305 |
| 2005/0076151 A1 | 4/2005 | Tapperson et al. |
| 2007/0128895 A1* | 6/2007 | Kleyer et al. ................ 439/76.1 |
| 2008/0123522 A1* | 5/2008 | Elliott et al. .................. 370/220 |
| 2010/0074156 A1 | 3/2010 | Tapperson et al. |
| 2011/0161538 A1 | 6/2011 | Decker |

* cited by examiner

METHOD FOR ELECTING AN ACTIVE MASTER DEVICE FROM TWO REDUNDANT MASTER DEVICES

TECHNICAL FIELD OF THE INVENTION

The present invention relates to the field of industrial automatic control devices, and more particularly of master devices, called "masters", that is to say devices capable of managing clusters of equipment or of instruments on a fieldbus.

More precisely, the present invention proposes a solution for managing the redundancy of such masters on a fieldbus. The method according to the invention comprises autonomous means of determining the active master device, the arbitration being carried out directly between the redundant master devices without requiring the presence of an independent third device. The redundancy in this instance relates to a question of availability of at least one master device on the fieldbus and not to a problem of security.

DESCRIPTION OF THE PRIOR ART

In a known manner, when two master devices are connected to one and the same fieldbus, for redundancy purposes, in order to alternately control said fieldbus, there are three conventional types of connection of these master devices. First, the interchanges between these master devices and the processor of the host machine are managed via a dedicated connection. Then, the said master devices are linked to the fieldbus on which they will be required to perform a control function. Finally, each master device is linked to a common "arbiter" responsible for allocating to each of said master devices the role that it must assume at a given moment.

Usually, the role of the arbitration system lies essentially in the following functions:
  Specifying a physical master device as the primary active master device, from two identical master devices;
  Detecting the occurrence of faults, in order to swap the role of the master devices and, for example, make the secondary master device active when the active primary master device is faulty, and vice versa;
  Assigning to each master device its operating mode which stems from the implementation of the above two functions.

A known basic solution consists in using a mechanical means, that is to say a switch, to determine which one of the two redundant master devices is active by default.

Another standard solution frequently used consists in having a dedicated communication channel between the two redundant master devices. This specific channel is used to determine the state and the operating conditions of each master device and to mutually detect the possible default modes.

As an example, document US 2011/0161538 A1 illustrates a technological background of the invention. It describes the management of two redundant master devices on one and the same motherboard, with an auto-addressing mechanism on the common fieldbus to which they are connected.

Document U.S. Pat. No. 6,757,777 B1 describes an arbitration system for arbitrating between two redundant master devices comprising an "elector" situated on a standardized fieldbus. This arbitration system is therefore external to the master devices; and the two master devices are not directly connected to the fieldbus.

Finally, document US 2002/0083364 A1 describes a method for managing two redundant programmable logic controllers, linked via a software link, but without this method being capable of performing the auto election, by intrinsic means of this link, of the active master programmable logic controller.

The object of the invention is therefore to propose a more efficient system of selecting an active master device from two redundant master devices. The present invention thus relates to a mechanism of auto election of the active master device.

DESCRIPTION OF THE INVENTION

Accordingly, the subject of the invention is a method for electing an active master device from two redundant primary and secondary master devices, said primary and secondary master devices being directly connected to a fieldbus and linked together by a terminal cable and each having an active operating mode and a standby mode with active monitoring. According to the invention, each of said primary and secondary master devices also has one and the same interface and one and the same state machine comprising means for designating one of said primary and secondary master devices as the active master device, and the terminal cable comprises intrinsic means for establishing a directional relation of the primary master device to the secondary master device.

Moreover, the primary master device and the secondary master device each comprise a primary input, a primary output, a secondary input and a secondary output and a terminal cable links the primary output of the primary master device to the secondary input of the secondary master device and the secondary output of the secondary master device to the primary input of the primary master device. When they start up, the two, primary and secondary, master devices signal, in an identical manner, that they are capable of operating on the interface by transmitting a nominal signal on their primary output and secondary output, the directional relation established by the terminal cable being configured such that the secondary master device detects the presence of the primary master device, if it is capable of operating, on its secondary input, and the primary master device detects the secondary master device, if it is able of operating, on its primary input; moreover, for the primary master device having detected on its primary input the secondary master device, the state machine of the primary master device proposes the active state, and for the secondary master device having detected on its secondary input the primary master device, the state machine of the secondary master device proposes the standby state with active monitoring.

Advantageously, an arbitration system is placed in each master device in order to decide autonomously on the respective operating mode of each master device as a function of the operating mode recommendations made by each state machine.

Advantageously, said arbitration system is capable of commanding a restart of the state machine.

Advantageously, the terminal cable uses a current loop making it possible to designate one of the master devices as the primary master device, i.e. the one that is active by default.

BRIEF DESCRIPTION OF THE FIGURES

Other features and advantages will appear in the following detailed description with reference to the appended drawings which represent.

DETAILED DESCRIPTION OF AT LEAST ONE EMBODIMENT

Figure 1:
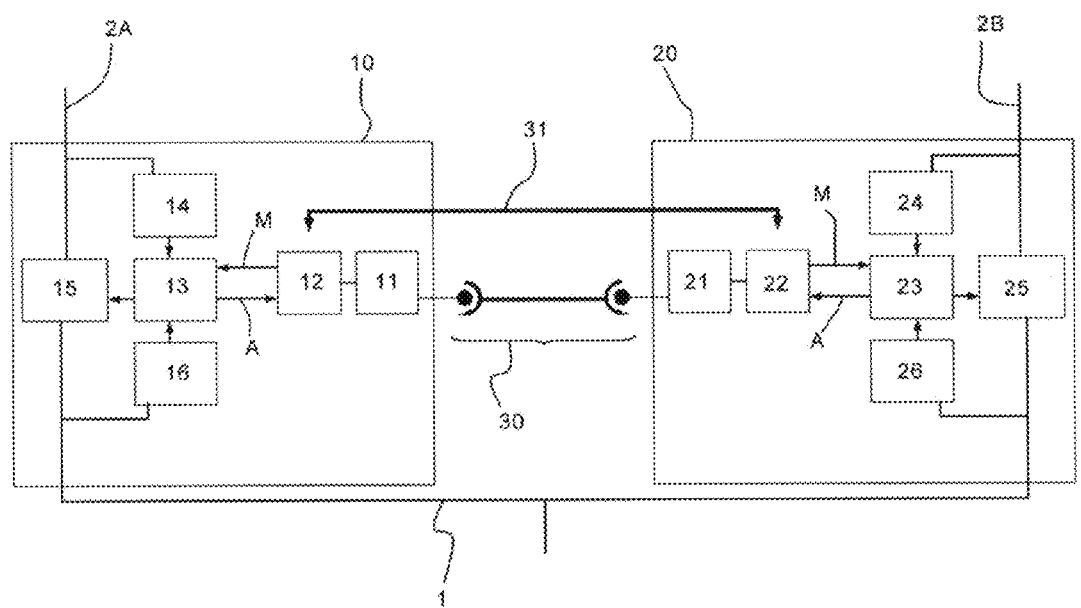
FIG. 1: the diagram of two master devices linked to one and the same fieldbus in an architecture allowing the use of the method according to the invention.

With reference to FIG. 1, the object of the present invention is the management of two master devices 10, 20 connected to a fieldbus 1. The object of the invention is to allow a direct negotiation between the master devices 10, 20 in such a way that, autonomously, and by virtue of the terminal cable 30 which links said master devices 10, 20, the system is capable of determining which is primary, that is to say active by default, and which is secondary, which must be active and which must be on standby.

The master devices 10, 20 are linked together by the terminal cable 30. Via their respective interfaces 11, 21, the state machines 12, 22 are capable of communicating and of implementing a competitive "elector" system 31. The state machines 12, 22 are identical and are capable of determining which will be the active master device and which will be the standby master device. To do this, the state machines 12, 22 are based on a set of signals interchanged between the master devices 10, 20 via the terminal cable 30. This terminal cable 30, through a appropriate wiring, moreover makes it possible to determine which is the primary master device, active by default, and which is the secondary master device.

Each master device 10, 20 is linked, via a connection bus 2A, 2B to a host furnished with a processor. This may be a single host for both master devices 10, 20; alternatively, each master device 10, 20 may be linked to a distinct host.

The master devices 10, 20 are, as seen above, also linked to a fieldbus 1 to which a cluster of devices to be managed is connected. Between these connection busses 2A, 2B and the fieldbus 1, the master devices 10, 20 comprise respectively a gateway 15, 25.

In the preferred embodiment of the invention, an arbitration system 13, 23 is also used. As a function of the accessibility or of the fault detection over the bus for connection to the host 2A, 2B, respectively via the means 14, 24, or as a function of the accessibility or of the fault detection over the fieldbus 1, respectively via means 16, 26, the arbitration system 13 arbitrates between the operating modes M proposed by the state machines 12, 22 for each of the master devices and can command the abort A of the current active operating mode of a master device in the event of a problem; accessibility fault, operating fault of the host, of the connection bus 2A, 2B, of the gateway 15, 25, of the fieldbus 1, etc.

As an illustration, the arbitration system 13 of the master device 10, considered in the present case to be the primary master device, may be required to arbitrate and to take the following decisions, depending on the situation:

If the master device 10 is active primary and if:
  The negotiation between the state machines 12, 22 culminates in proposing the active state for the primary master device 10;
  The bus 2A for connection with the host is operational;
  The fieldbus 1 is operational;
  Then, the master device 10 remains active. Optionally, the abort instruction is conditional upon an instruction originating from the host or from the fieldbus 1.

If the master device 10 is active primary and if:
  The negotiation between the state machines 12, 22 culminates in proposing the active state for the primary master device 10;
  The bus 2A for connection with the host is operational;
  The fieldbus 1 is faulty;
  Then, the master device 10 remains active. Optionally, the abort instruction is conditional upon an instruction originating from the host.

If the master device 10 is active primary and if:
  The negotiation between the state machines 12, 22 culminates in proposing the active state for the primary master device 10;
  The bus 2A for connection to the host is faulty;
  The fieldbus 1 is operational;
  Then, the master device 10 remains active. Optionally, the abort instruction is conditional upon an instruction originating from the fieldbus 1.

If the master device 10 is active primary and if:
  The negotiation between the state machines 12, 22 culminates in proposing the active state for the primary master device 10;
  The bus 2A for connection to the host is faulty;
  The fieldbus 1 is faulty;
  Then, the master device 10 remains active. Optionally, the abort instruction is automatically given.

If the master device 10 is active primary and if:
  The negotiation between the state machines 12, 22 recommends the standby state for the primary master device 10;
  The state of the connection bus 2A is unknown;
  The state of the fieldbus 1 is unknown;
  Then, the master device 10 switches to standby.

If the master device 10 is primary and on standby, and if:
  The negotiation between the state machines 12, 22 recommends the standby state for the primary master device 10;
  The state of the connection bus 2A is unknown;
  The state of the fieldbus 1 is unknown;
  Then, the master device 10 remains on standby.

If the master device 10 is primary and on standby, and if:
  The negotiation between the state machines 12, 22 culminates in proposing the active state for the primary master device 10;
  The connection bus 2A is operational;
  The fieldbus 1 is operational;
  Then, the master device 10 remains on standby and is capable of becoming active on request from the host or from the fieldbus 1. Optionally, no abort instruction is given.

If the master device 10 is primary and on standby, and if:
  The negotiation between the state machines 12, 22 culminates in proposing the active state for the primary master device 10;
  The connection bus 2A is faulty;
  The fieldbus 1 is operational;
  Then, the master device 10 remains on standby. Optionally, an abort instruction is given.

If the master device 10 is primary and on standby, and if:
  The negotiation between the state machines 12, 22 culminates in proposing the active state for the primary master device 10;
  The connection bus 2A is operational;
  The fieldbus 1 is faulty;
  Then, the master device 10 remains on standby. Optionally, an abort instruction is given.

Figure 2:
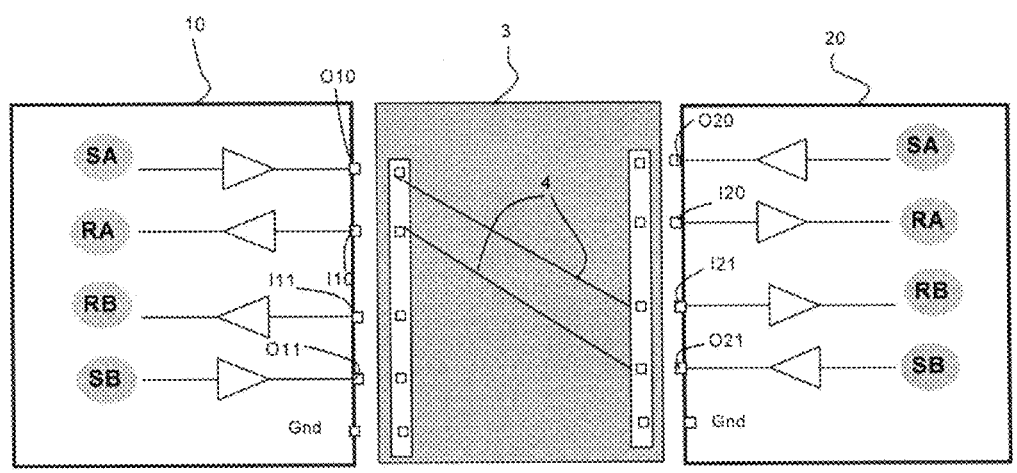
FIG. 2: the diagram of an example of a specific link, called a terminal cable, between the two redundant master devices, allowing the use of the method according to the invention.
Figure 3:
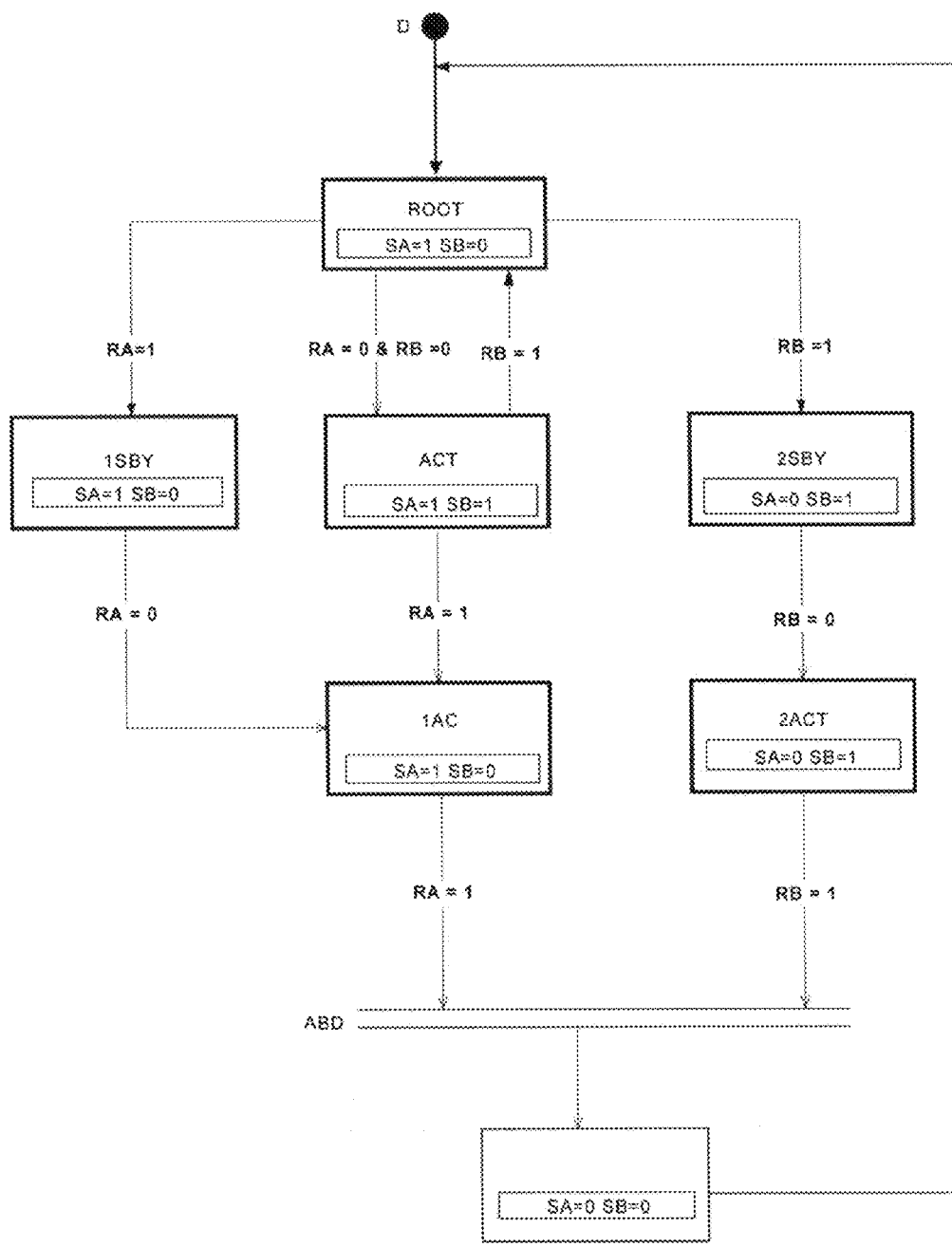
FIG. 3: the representation of an example of a state machine that can be used on each of the two redundant master devices, according to the method according to the invention.

FIGS. 2 and 3 illustrate respectively an example of a terminal cable 30 that can link two master devices 10, 20 and an example of a state machine capable of determining the operating mode—in particular active or standby—of each of said master devices 10, 20.

In the embodiment shown in FIG. 2, the master devices 10, 20 are connected to one and the same backplane motherboard 3. Note here that it is not a necessary condition and that the master devices 10, 20 may be connected to distinct motherboards. Each master device 10, 20 comprises a primary output O10, O20 and a primary input I10, I20, and a secondary output O11, O21 and a secondary input I11, I21 carrying respectively signals SA, RA, SB, RB. Via the wiring 4 linking the primary output O10 from the master device 10 to the secondary input I21 of the master device 20 and the secondary output O21 from the master device 20 to the primary input I10 of the master device 10, and by using the state machines 12, 22 as described in FIG. 3, the master device 10 is defined as being the primary master device, that is to say active by default, and the master device 20 as being the secondary master device.

As an illustration, and for more clarity with respect to the references to the above figures, the state machine shown in FIG. 3 is considered to be that of the master device 10, but that of the master device 20 is identical. It is considered in FIG. 3 that the terminal cable shown in FIG. 2 is used. According to this embodiment, at start-up D, each master device transmits, in a first step ROOT, a signal SA set at 1 on its primary output O10, its secondary output O11, associated with the signal SB, remaining at 0. After the step ROOT, if a signal RA set at 1 is received on the primary input I10, it means that the master device 20 has transmitted on its secondary output O21 a signal SB set at 1, that said master device 20 is the secondary master device and that it is active; the master device 10 is then primary and on standby 1SBY until the primary input I10 detects that RA has switched to 0; then the primary master device 10 becomes active 1ACT.

After the step ROOT, if the signals RA and RB are at 0, it means that the master device 20 is no longer transmitting on any of its outputs and that the master device 10 is therefore necessarily active ACT. From there, if RB switches to 1, the state machine returns to the step ROOT, and if RA is set at 1, the master device 10 remains active and is the primary master device 1ACT.

After the first step ROOT, if RB is set at 1, it means that the master device 20 has sent a signal SA set at 1 meaning that the master device 20 is the primary master device and that it is active. The master device 10 is therefore secondary and on standby 2SBY. If RB switches to 0, the master device 10 must switch to the active state 2ACT.

If while it is primary and active 1ACT, the primary device 10 detects on its primary input I10 a signal RA set at 1 or, conversely, if it is secondary and active 2ACT and it detects on its secondary input I11 a signal RB set at 1, the state machine of the master device 10 can instruct an abort ABD allowing a restart of said state machine.

Figure 4:
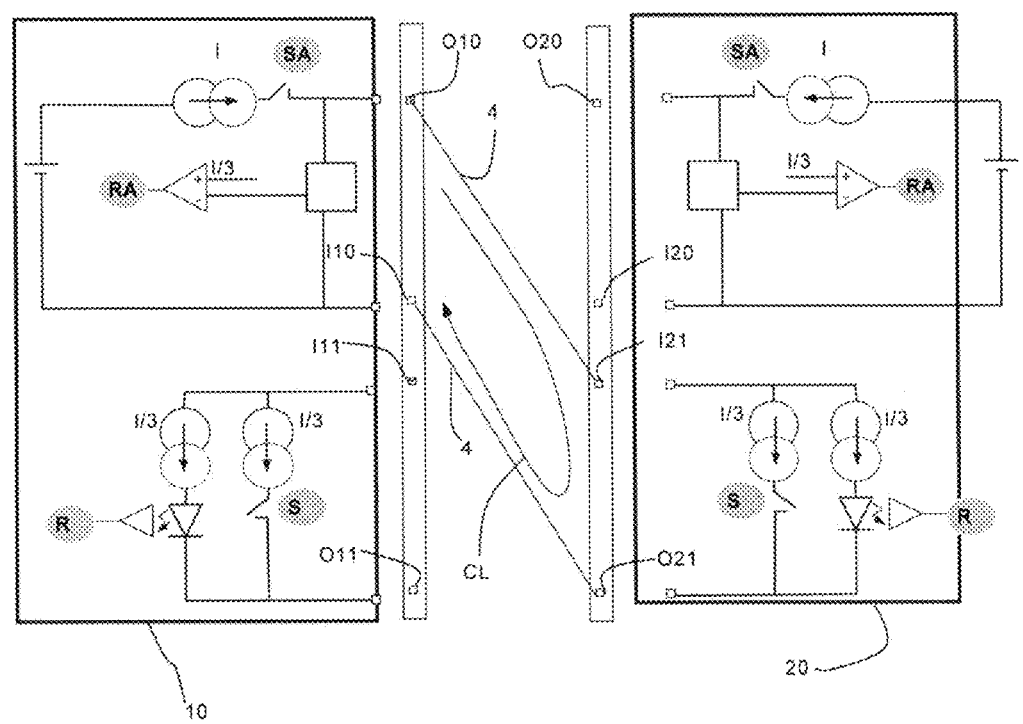
FIG. 4: the diagram of an electronic embodiment of the specific link shown in FIG. 2.

FIG. 4 represents a means of electronic implementation of the terminal cable between the redundant master devices 10, 20, the principle of said terminal cable being described in FIG. 2 with the aid of a current loop CL.

The primary outputs O10, O20, are configured to transmit an electrical signal of a chosen intensity I. Because of the wiring 4 represented in FIG. 4, the master device 10 is primary and the master device 20 is secondary. By setting its output SA to 1, the master device 10 therefore transmit on its primary output O10 a current set at I. By measuring the intensity of the current in the loop CL, it is possible to determine the value of RA; if a master device 20 is indeed connected, I/3, for example, is shunted as a signal RB signifying the detection, by the master device 20, of the presence and of the active state of the master device 10; then RB is set at 1. Again I/3, still as an example, is shunted if the master device 20 is active; then SB is set at 1. The value of the current measured at the primary input of the master device 10 is then compared with I/3. If the current measured at the primary input of the master device 10 is below I/3, RA is set at 1, otherwise RA is set at 0.

Starting from the respective values of SA, SB, RA, RB, the state machines of the master devices 10, 20 can be implemented according to FIG. 3.

In summary, the present invention represents a method of autodetermination of the operating mode—active or standby—of each master device from two redundant master devices connected to one and the same fieldbus. This result is obtained essentially through the use of a specific terminal cable comprising a two-wire link and state machines assuming the function of elector according to a standalone principle of negotiation.

According to the invention, an arbitration system can be provided to make the decision if necessary on the respective operating mode of each master device, notably in the case of a link fault with the fieldbus or with the bus for connection to the host.

The invention claimed is:

1. A method for electing active master circuitry from two redundant primary and secondary master circuitry, the primary and secondary master circuitry being directly connected to a fieldbus and linked together by a terminal cable and each having an active operating mode and a standby mode with active monitoring, and also having one and the same interface, wherein each of the primary and secondary master circuitry also has one and the same state machine, a pair of primary output/input, and a pair of secondary output/input, the method comprising:

designating one of the primary and secondary master circuitry as the active master circuitry, and the other master circuitry as the standby master circuitry with active monitoring;

linking, by the terminal cable, the pair of primary output/input of the primary master circuitry to the pair of secondary output/input of the secondary master circuitry instead of the pair of primary output/input of the secondary master circuitry, wherein the linking establishes a directional relation that designates a default state of the primary master circuitry as the active operating mode and designates a default state of the secondary master circuitry as the standby mode at a startup of the primary master circuitry and the secondary master circuitry;

detecting on the secondary input of the secondary master circuitry, by the secondary master circuitry, a presence of the primary master circuitry if the primary master circuitry is capable of operating;

proposing, by the state machine of the secondary master circuitry, the standby mode with the active monitoring when the presence of the primary master circuitry is detected;

detecting on the primary input of the primary master circuitry, by the primary master circuitry, a presence of the secondary master circuitry if the secondary master circuitry is capable of operating; and proposing, by the state machine of the primary master circuitry, the active operating mode when the presence of the secondary master circuitry is detected.

2. The method according to claim 1, wherein an arbitration system is placed in each master circuitry in order to decide autonomously on the respective operating mode of each master circuitry as a function of the operating mode designated by each state machine.

3. The method according to claim 2, wherein the arbitration system is capable of commanding a restart of the each state machine.

4. The method according to claim 1, wherein the terminal cable uses a current loop to designate one of the primary and secondary master circuitry as a default active primary master circuitry.

\* \* \* \* \*